(12) United States Patent
Florence

(10) Patent No.: US 8,799,031 B2
(45) Date of Patent: Aug. 5, 2014

(54) SYSTEM AND METHOD TO SCREEN INSURANCE CLAIMS TO IDENTIFY SUBROGATION POTENTIAL

(75) Inventor: Jeffery K. Florence, Palmer, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 42 days.

(21) Appl. No.: 13/470,479

(22) Filed: May 14, 2012

(65) Prior Publication Data

US 2013/0304517 A1   Nov. 14, 2013

(51) Int. Cl.
*G06Q 40/00*   (2012.01)

(52) U.S. Cl.
USPC .......................................................... 705/4

(58) Field of Classification Search
None
See application file for complete search history.

(56) References Cited

U.S. PATENT DOCUMENTS

| | | | |
|---|---|---|---|
| 5,956,687 A * | 9/1999 | Wamsley et al. | 705/2 |
| 7,343,308 B1 | 3/2008 | Rojewski et al. | |
| 7,739,133 B1 * | 6/2010 | Hail et al. | 705/4 |
| 7,962,385 B2 | 6/2011 | Falk et al. | |
| 8,073,718 B2 | 12/2011 | Hogan et al. | |
| 2004/0111302 A1 | 6/2004 | Falk et al. | |
| 2005/0137914 A1 * | 6/2005 | Schmitter et al. | 705/4 |
| 2007/0174094 A1 | 7/2007 | Ramsey | |
| 2011/0320226 A1 | 12/2011 | Graziano et al. | |
| 2012/0059678 A1 | 3/2012 | Hogan et al. | |

OTHER PUBLICATIONS

Kutty, Shashidharan K. Managing Life Insurance. Prentice-Hall. 2008. p. 91.*
Murphy, Leonard E; Downs, Andrew B; Levin, Jay M. Property Insurance Litigator's Handbook. ABA Publishing. 2006. pp. 68-70, 93-94 and 114.*
Backhaus, Jurgen G. The Elgar Companion to Law and Economics. Edward Elgar Publishing. 2005. p. 93.*

* cited by examiner

*Primary Examiner* — Jason M Borlinghaus
(74) *Attorney, Agent, or Firm* — Howard IP Law Group, PC

(57) ABSTRACT

Systems and methods are disclosed herein for screening insurance claims to identify subrogation potential. According to some embodiments, a loss report associated with a plurality of insurance claims, includes, for each insurance claim: (i) a claim identifier, (ii) a claim date, (iii) a claim loss amount, and (iv) a claim description. Data from the loss report may be loaded into a subrogation engine, such as by loading the data into cells of a spreadsheet application. The spreadsheet application may then automatically calculate a subrogation potential score for each insurance claim in the loss report based on the claim date, claim loss amount, claim description, and a library containing keywords and associated keyword values. The spreadsheet application may then output an indication of the claim identifier and associated subrogation potential score for each insurance claim in the loss report.

17 Claims, 13 Drawing Sheets

| CLAIM IDENTIFIER 302 | DESCRIPTION 304 |
|---|---|
| C_101 | BACKING UP |
| C_102 | REAR END |
| C_103 | PEDESTRIAN |
| C_104 | LANE CHANGE |
| C_103 | BACKING UP |

FIG. 3

| KEYWORD 402 | VALUE 404 |
|---|---|
| BACKING UP | 80 |
| LANE CHANGE | 25 |
| PARKED | 90 |
| ANIMAL | 50 |
| REAR END | 90 |

400

| CLAIM IDENTIFIER 602 | JURISDICTION 604 | DESCRIPTION 606 | DATE 608 | AMOUNT PAID 610 | AMOUNT PREVIOUSLY RECOVERED 612 |
|---|---|---|---|---|---|
| C_101 | NY | BACKING UP | 4/7/2016 | $1,000 | 0 |
| C_102 | CA | REAR END | 6/12/2014 | $6,000 | 0 |
| C_103 | CA | PEDESTRIAN | 9/16/2016 | $2,600 | $600 |
| C_104 | FL | LANE CHANGE | 3/1/2016 | $3,000 | 0 |
| C_105 | DC | BACKING UP | 7/4/2016 | $10,600 | $6,000 |

SYSTEM AND METHOD TO SCREEN INSURANCE CLAIMS TO IDENTIFY SUBROGATION POTENTIAL

FIELD OF THE INVENTION

Some embodiments described herein are directed to insurance claims. In particular, some embodiments are associated with an automated screening of insurance claims to identify subrogation potential.

BACKGROUND

An insurance company may provide payments to an insured in connection with an insurance claim. For example, an insurance company might provide payment of $10,000 to an insured in connection with an insurance claim associated with an automobile accident. In some cases, the insurance company may potentially be entitled to recover some or all of the payment from another party (e.g., one or more other insurance companies). Note that amount of such a potential, referred to herein as the "subrogation potential" of an insurance claim, may vary based on the circumstances associated with the accident. For example, if the insured was in a parked car when the accident occurred, there may be a high likelihood of determining which party was at fault in the accident, and the subrogation potential of such an insurance claim may be relatively high (e.g., that particular claim may represent a good opportunity for the insurance company to recover some or all of the loss). In contrast, if the insured was changing lanes when the accident occurred, it may be much less likely that a definitive determination of fault can be made, and the subrogation potential of the insurance claim may be relatively low.

The subrogation potential of insurance claims can also be influenced by other factors. For example, a statute of limitations may impact the subrogation potential of an insurance claim (and the time period associated with the statute of limitations can vary depending on where the accident occurred). Similarly, different states have different negligence rules that might alter the subrogation potential of insurance claims.

Note that an accurate determination of subrogation potential may be very valuable to an insurance company. For example, tens of thousands of insurance claims may have potential value that could be recovered from other insurance companies. It may be impractical, however, to have employees investigate and follow-up on each and every insurance claim. Thus, employees may instead review insurance claims manually to identify those with the highest subrogation potential (and only those insurance claims may be pursued). Manually determining subrogation potential, however, can be a time consuming and error prone task (e.g., because of the different types of accidents and/or jurisdictions that may be involved with different insurance claims).

It would be desirable to provide systems and methods to screen insurance claims to identify subrogation potential in an automated, efficient, and accurate manner.

SUMMARY OF THE INVENTION

According to some embodiments, systems, methods, apparatus, computer program code and means may be provided to facilitate a screening of insurance claims to identify subrogation potential. In some embodiments, a library of keywords may be used in connection with a loss report and a subrogation engine.

According to some embodiments, a loss report associated with a plurality of insurance claims, includes, for each insurance claim: (i) a claim identifier, (ii) a claim date, (iii) a claim loss amount, and (iv) a claim description. Data from the loss report may be loaded into cells of a spreadsheet application. The spreadsheet application may then automatically calculate a subrogation potential score for each insurance claim in the loss report based on the claim date, claim loss amount, claim description, and a library containing keywords and associated keyword values. The spreadsheet application may then output an indication of the claim identifier and associated subrogation potential score for each insurance claim in the loss report.

Some embodiments provide: means for loading data from a loss report into a subrogation engine, the loss report being associated with a plurality of insurance claims and including, for each insurance claim: (i) a claim identifier, and (ii) a claim description; means for calculating, by the subrogation engine, a subrogation potential score for each insurance claim in the loss report based on the claim description and a library containing keywords and associated keyword values; and means for outputting, via the subrogation engine, an indication of the claim identifier and associated subrogation potential score for each insurance claim in the loss report.

A technical effect of some embodiments of the invention is an improved and computerized method of screening insurance claims to identify subrogation potential. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 3 is a tabular portion of a loss report database or spreadsheet according to some embodiments.

DESCRIPTION

An insurance company may provide payments to an insured in connection with an insurance claim. For example, an insurance company might provide payment of $10,000 to an insured in connection with an insurance claim associated with an automobile accident. In some cases, the insurance company may potentially be entitled to recover some or all of the payment from another party (e.g., another insurance company). Moreover, the subrogation potential of an insurance claim may vary based on the circumstances associated with the claim.

Figure 1:
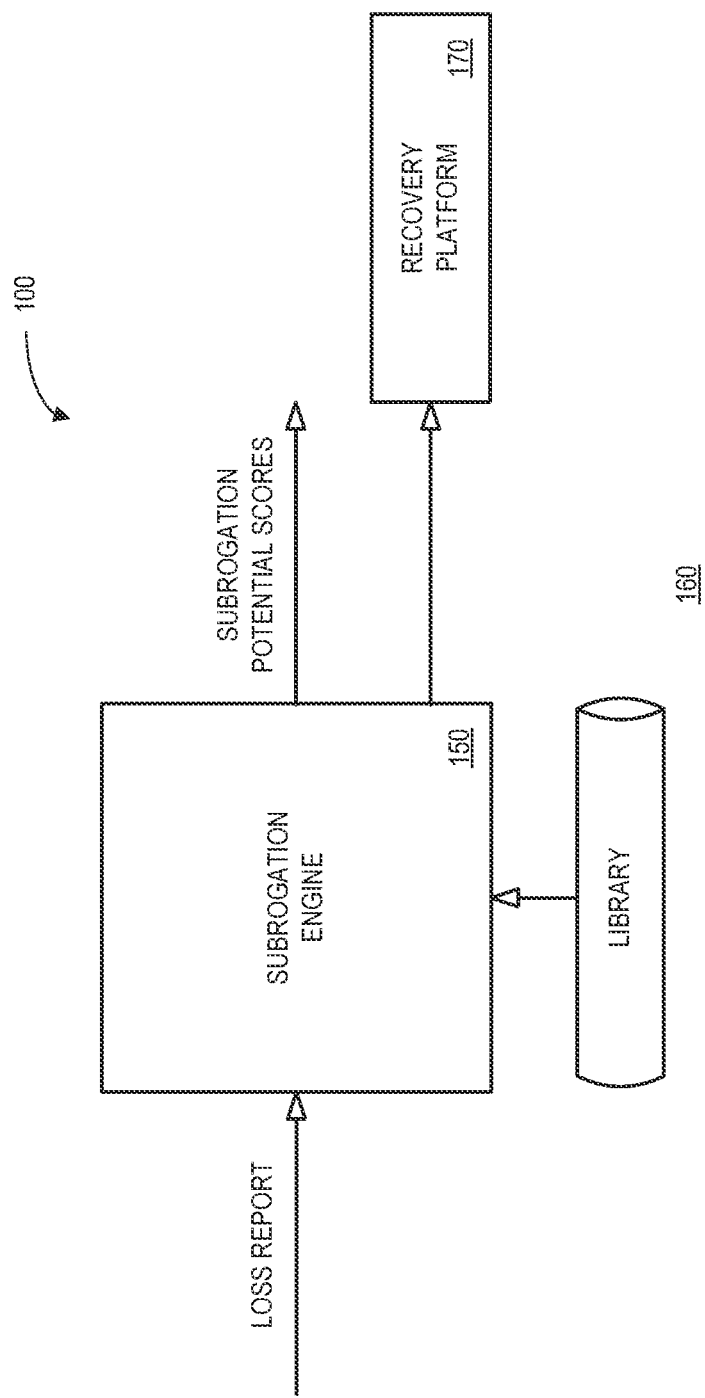
FIG. 1 is block diagram of a system according to some embodiments of the present invention.

To facilitate an automatic and accurate screening of insurance claims to identify subrogation potential, FIG. 1 is a block diagram of a system 100 according to some embodiments of the present invention. In particular, a subrogation engine 150 may receive or retrieve a loss report including details about a plurality of insurance claims (e.g., tens of thousands of insurance claims). The loss report might be locally stored or received from another system or device. The subrogation engine 150 might be, for example, associated with a Personal Computers (PC), laptop computer, an enterprise server, a server farm, and/or a database or similar storage devices. The subrogation engine 150 may, according to some embodiments, be associated with an insurance company or third-party service.

According to some embodiments, an "automated" subrogation engine 150 may facilitate processing of insurance claims in the loss report. As used herein, the term "automated" may refer to, for example, actions that can be performed with little or no human intervention.

As used herein, devices, including those associated with the subrogation engine 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The subrogation engine 150 may also access information in one or more libraries 160. The library 160 may be locally stored or reside remote from the subrogation engine 150. As will be described further below, the library 160 may be used by the subrogation engine 150 to help screen insurance claims.

Although a single subrogation engine 150 is shown in FIG. 1, any number of such devices may be included. Moreover, various devices described herein might be combined according to embodiments of the present invention. For example, in some embodiments, the subrogation engine 150 and library 160 might be co-located and/or may comprise a single apparatus.

According to some embodiments, the system 100 further includes a recovery platform 170 (e.g., a computer or computer system) that may help facilitate an automatic initiation of a claim recovery process. For example, based on information received from the subrogation engine 150, the recover platform 170 might automatically create a demand letter, email, or otherwise begin the process of recovering funds from another party.

Figure 2:
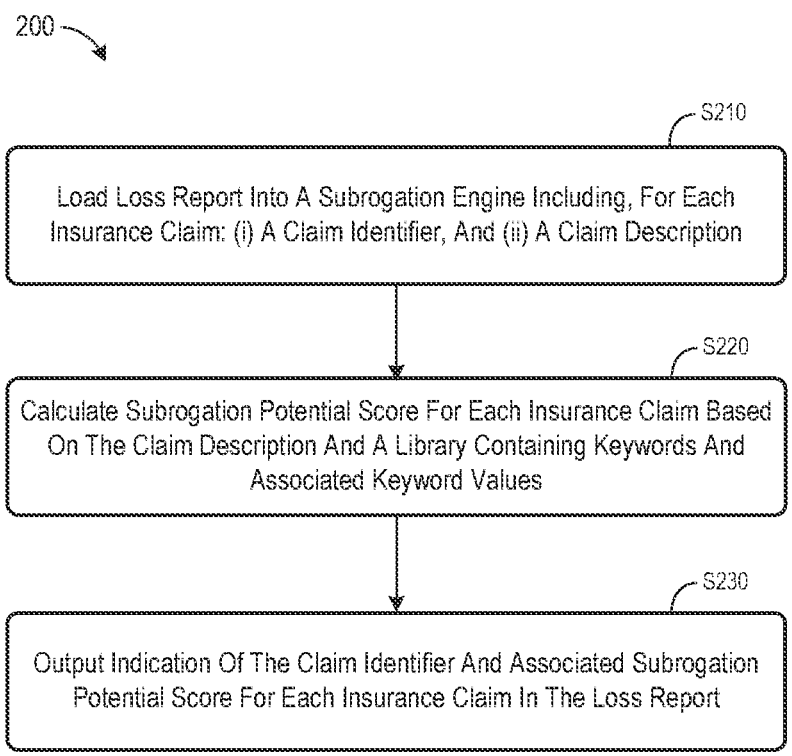
FIG. 2 illustrates a method according to some embodiments of the present invention.

FIG. 2 illustrates a method 200 that might be performed, for example, by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, data from a loss report may be loaded into a subrogation engine, the loss report being associated with a plurality of insurance claims. The insurance claims might, for example, be related to property insurance, automobile insurance, or workers' compensation insurance. Consider, by way of example, FIG. 3 which is a tabular portion of a loss report database or spreadsheet 300 according to some embodiments. The table may include, for example, entries identifying insurance claims that have resulted in payments by an insurance company. The table may also define fields 302, 304 for each of the entries. The fields 302, 304 may, according to some embodiments, specify: a claim identifier 302, and a description 304. The information in the loss report 300 may be created and updated, for example, whenever payment is made on an insurance claim.

The claim identifier 302 may be, for example, a unique alphanumeric code identifying an insurance claim. The description 304 may be, for example, a text string describing aspects and/or circumstance of the insurance claim. For example, the insurance claim having an insurance claim identifier of "C_104" occurred as a result of a "lane change" while driving. Note that the description 304 might be associated with a type of accident or a type of loss and might include, for example: collision, rental reimbursement, physical damage, bodily injury, weather, medical expense, vandalism, theft, flood, personal injury protection, etc.

Referring again to FIG. 2, at S220 the subrogation engine may calculate a subrogation potential score for each insurance claim in the loss report. The calculation performed at S220 may, for example, be based on the claim description and a library containing keywords and associated keyword values. Consider, by way of example, FIG. 4 which is a tabular portion of a library database or spreadsheet 400 according to some embodiments. The table may include, for example, entries identifying keywords. The table may also define fields 402, 404 for each of the entries. The fields 402, 404 may, according to some embodiments, specify: a keyword 402, and a value 404. The information in the library 400 may be created and updated, for example, by an employee of an insurance company (e.g., based on his or her experience with various types of insurance claims).

The keyword 402 might comprise a text string associated with a word or phrase. The value 404 may, for example, represent a likelihood of determining or establishing fault for accidents associated with each keyword. For example, when an insurance claim includes the keyword 402 "Parked" it may be relatively straight forward to determine which party was at fault and thus a relatively high value 404 of "90" may be assigned to that keyword 402. Note that the value 404 might be a numerical value, an expected dollar amount, or a category (e.g., "high" or "low"). According to some embodiments, a single insurance claim description might contain several different keywords 402. In this case, one word might override another word (e.g., based on the associated value or position in the library) or multiple values might be blended or combined in accordance with a weight. Similarly, a single keyword 402 might appear multiple times in a single claim description (e.g., and may increase or otherwise alter the subrogation potential associated with the insurance claim).

Referring again to FIG. 2, at S230 the subrogation engine may output an indication of the claim identifier and associated subrogation potential score for each insurance claim in the loss report. Consider, by way of example, FIG. 5 which is a tabular portion of a result database or spreadsheet 400 according to some embodiments. The table may include, for example, entries identifying insurance claims. The table may also define fields 502, 504 for each of the entries. The fields 502, 504 may, according to some embodiments, specify: a claim identifier 502, and a subrogation potential score 504. The information in the result database 500 may be automatically created and/or updated, for example, when values in a spreadsheet program are changed. The generation of the result database 500 might be, for example, performed periodically, as a batch process, each business day. According to some embodiments, the subrogation engine is associated with a spreadsheet application, such as the EXCEL spreadsheet program available from Microsoft. In this case, a loss report 300, library 400, result database 500 and/or any of the data or rules described herein may be stored in various cells and/or worksheets of the spreadsheet application.

The claim identifier 502 may be a unique alphanumeric code identifying an insurance claim, and may, according to some embodiments, be based on or otherwise associated with the claim identifier 302 in the loss report 300. The subrogation potential score 504 may comprise, for example, a numerical value or a classification indicating whether or not an insurance company should pursue each insurance claim. For example, in the example of FIGS. 3 through 5, a subrogation potential score 504 of "probable" is assigned to insurance claims containing a keyword 402 having a value 404 higher than fifty. In contrast, a subrogation potential score 504 of "doubtful" is assigned to insurance claims containing a keyword 404 that does not have an associated value 404 higher than fifty. In this way, an insurance company might decide to not pursue claims in the "doubtful" category because it may be difficult to determine fault in those types of accidents (and, as a result, recovery of funds from another insurance company may be unlikely).

Figure 4:
FIG. 4 is a tabular portion of a library database or spreadsheet according to some embodiments.
Figure 5:
FIG. 5 is a tabular portion of a result database or spreadsheet according to some embodiments.

Although text strings have been used in the example of FIGS. 3 through 5, according to some embodiments, audio, images, and video might be evaluated to determine a subrogation potential score 504. Similarly, natural language techniques may be used to search through accident reports, insurance agent summaries, police reports, etc. to calculate an appropriate subrogation potential score 504. Moreover, according to some embodiments, a summary report associated with a plurality of insurance claims in a loss report may be generated (e.g., to indicate that 5,000 "probable" insurance claims have been identified).

Figure 6:
FIG. 6 is a tabular portion of a more detailed loss report database or spreadsheet according to some embodiments.

The example of FIGS. 3 though 5 contains a very limited amount of information, and actual implementations might include other values. For example, FIG. 6 is a tabular portion of a more detailed loss report 600 according to some embodiments. The table or spreadsheet may include, for example, entries identifying insurance claims that have resulted in payments by an insurance company. The table may also define fields 602, 604, 606, 608, 610, 612 for each of the entries. The fields 602, 604, 606, 608, 610, 612 may, according to some embodiments, specify: a claim identifier 602, a jurisdiction 604, a description 606, a date 608, an amount paid 610, and an amount previously recovered 612. The information in the loss report 600 may be created and updated, for example, whenever payment is made or received in connection with an insurance claim.

The claim identifier 602 may be, for example, a unique alphanumeric code identifying an insurance claim. The jurisdiction 604 may indicate, for example, where an accident occurred (e.g., a state in which the accident occurred). The description 606 may be, for example, a text string describing aspects and/or circumstance of the insurance claim. For example, the insurance claim having an insurance claim identifier of "C_102" occurred as a result of a "rear end" collision in California ("CA").

The date 608 may represent a date of loss 608 (e.g., the date on which the accident occurred or when an insurance claim was made) and the amount paid 610 may represent a value of payment made in connection with the insurance claim. The amount previously recovered 612 may represent, for example, a value previously received from another insurance company in connection with the insurance claim. For example, the insurance company paid out a total of $10,600 for the insurance claim having an insurance claim identifier of "C_105" and has already received $6,000 back from other insurance companies.

According to some embodiments, a subrogation potential score may be calculated and/or adjusted based on the amount paid 610 and/or amount previously recovered 612. For example, insurance claims having an amount paid 610 of less than $1,000 may be assigned a relatively low subrogation potential score (because it may not be worth pursuing relative small amounts). Similarly, insurance claims where almost the entire amount paid 610 has already been recovered may receive a relatively low subrogation potential score. Note that such adjustments may be made in addition to or instead of keywords values. Likewise, any of the factors described herein may be implemented in any combination.

Figure 7:
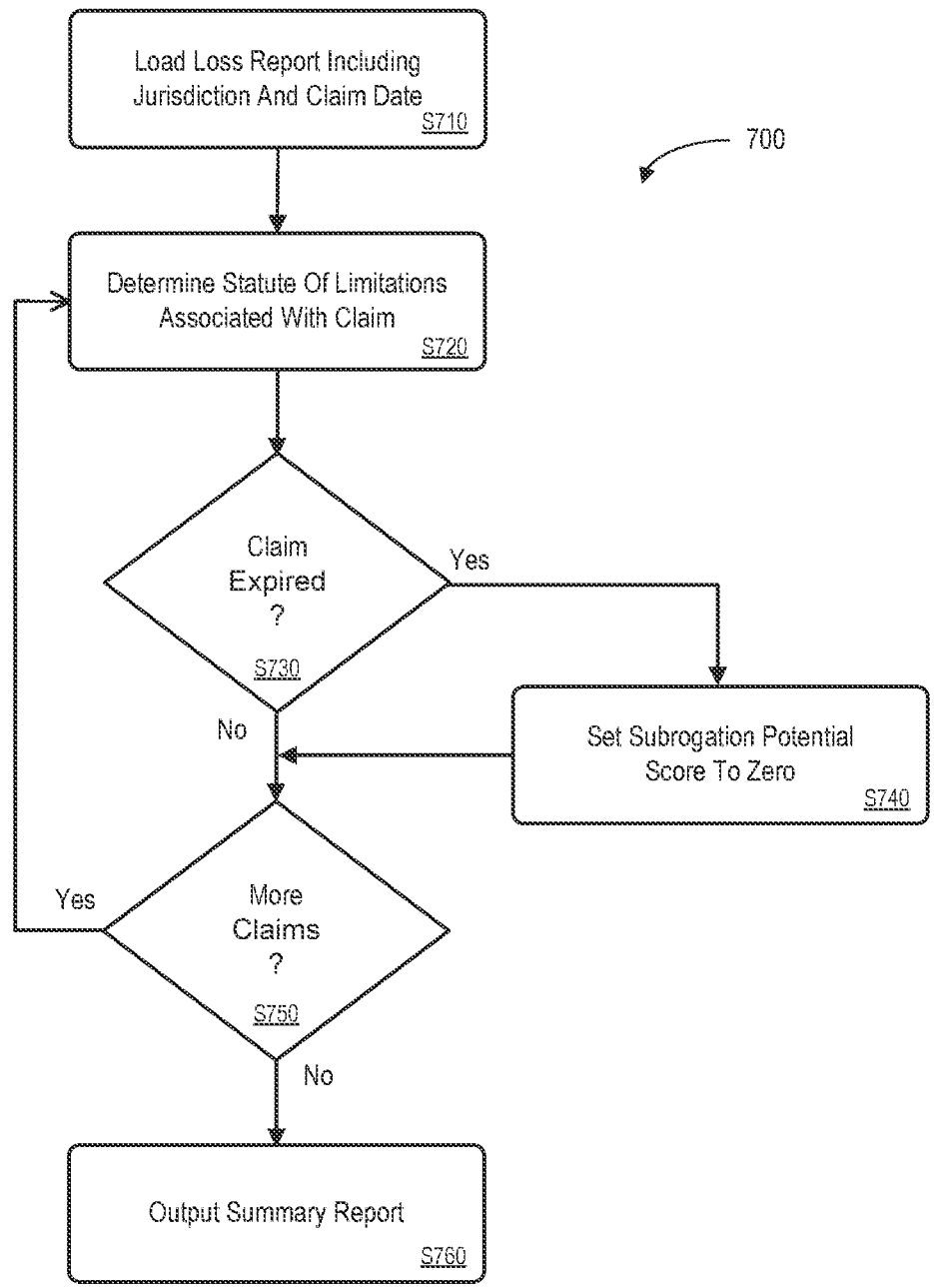
FIG. 7 illustrates a method associated with statutes of limitations according to some embodiments of the present invention.
Figure 8:
FIG. 8 is a tabular portion of a statute of limitations database or spreadsheet according to some embodiments.

Note that the jurisdiction 604 may indicate which state laws or regulations are applicable for each insurance claim. Moreover, different laws or regulations may impact the subrogation potential of an insurance claim. For example, FIG. 7 illustrates a method 700 associated with statutes of limitations according to some embodiments of the present invention. At S710, a loss report including a claim jurisdiction and claim date is loaded (e.g., such as the loss report 600 of FIG. 6). At S720, a statute of limitations time period associated with each claim is determined based on the claim jurisdiction. Consider, by way of example, FIG. 8 which is a tabular portion of a statute of limitations database or spreadsheet 800 according to some embodiments. The table may include, for example, entries identifying all 50 states in the United States along with the District of Columbia and any other covered territory. The table may also define fields 802, 804 for each of the entries. The fields 802, 804 may, according to some embodiments, specify: a jurisdiction 802, and a statute of limitations 804. The information in the statute of limitations database 800 may be automatically created and/or updated, for example, by an employee of an insurance company.

The jurisdiction 802 may be a unique alphanumeric code identifying a state, and may, according to some embodiments, be based on or otherwise associated with the jurisdiction 604 in the loss report 600 of FIG. 6. The statute of limitations 804 may comprise, for example, an indication of a time period during which money may be recovered from other insurance companies. For example, in California money may need to be recovered within three years of an accident or when an insurance claim is made. According to some embodiments, a subrogation engine may further determine whether or not insurance policy imposed deadlines associated with an insurance claim have expired.

Referring again to FIG. 7, it is determined whether a potential claim has expired at S730. If so, a subrogation potential score might be set to "zero" at S740 (e.g., because there is no chance of recovering funds from another insurance company at this point in time). If the potential claim has not expired at S730, it is determined whether or not there are more insurance claims to process at S750. If there are no additional claims at S750, a summary report is generated and output at S760. If there are additional claims at S750, the process continues for the next insurance claim at S720 (e.g., the statute of limitations time period for the next claim may be determined). According to some embodiments, different statutes of limitation periods may be applicable to different types of loss (e.g., there might be a property loss statute of limitation and a medical loss statute of limitation) in which case a subrogation potential score might be adjusted as appropriate.

According to some embodiments, each insurance claim in a loss report may further include a claim type indicating, for example, that the claim is associated with a medical loss, property damage, rental reimbursement, and/or Personal Injury Protection ("PIP") insurance. Any of the subrogation potential determinations and/or calculations described herein may further be based on such a claim type. For example, medical losses may be associated with a one statute of limitations while property damages are associated with a different one.

Figure 9:
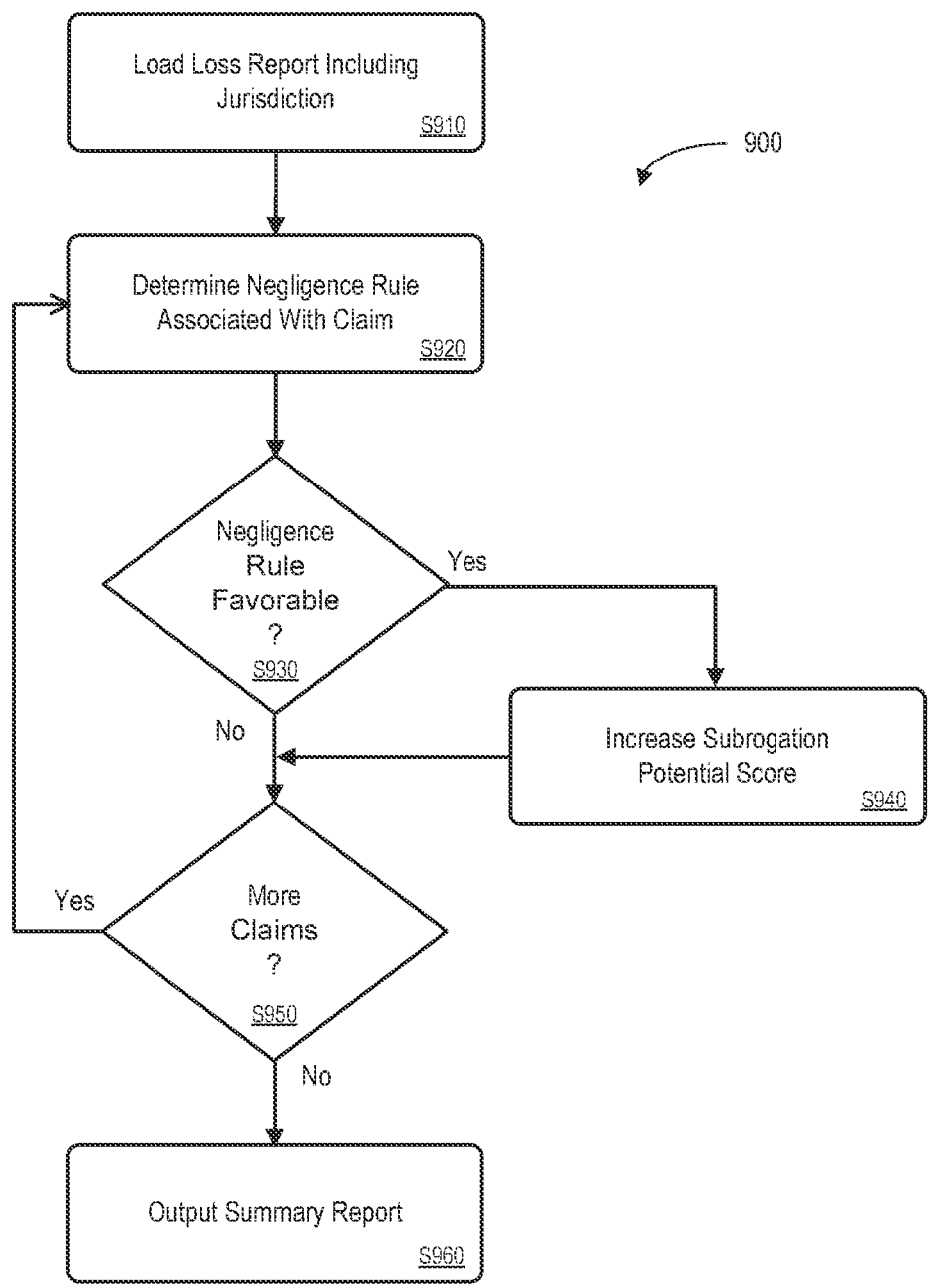
FIG. 9 illustrates a method associated with negligence rules according to some embodiments of the present invention.
Figure 10:
FIG. 10 is a tabular portion of a negligence rules database or spreadsheet according to some embodiments.

Note that other jurisdiction-based factors might also impact a subrogation potential score. For example, FIG. 9 illustrates a method 900 associated with negligence rules according to some embodiments of the present invention. At S910, a loss report including a claim jurisdiction is loaded (e.g., such as the loss report 600 of FIG. 6). At S920, a negligence rule associated with each claim is determined based on the claim jurisdiction. Consider, by way of example, FIG. 10 which is a tabular portion of a negligence rule database or spreadsheet 1000 according to some embodiments. The table may include, for example, entries identifying all 50 states in the United States along with the District of Columbia and any other covered territory. The table may also define fields 1002, 1004 for each of the entries. The fields 1002, 1004 may, according to some embodiments, specify: a jurisdiction 1002, and negligence rule 1004. The information in the negligence rule database 1000 may be automatically created and/or updated, for example, by an employee of an insurance company.

The jurisdiction 1002 may be a unique alphanumeric code identifying a state, and may, according to some embodiments, be based on or otherwise associated with the jurisdiction 604 in the loss report 600 of FIG. 6. The negligence rule 1004 may comprise, for example, an indication of rule that exists in a particular state regarding when a party may recover damages resulting from an accident. For example, Alabama might implement a "contributory" negligence rule while Alaska implements a "comparative" rule. According to some embodiments, the negligence rule 1004 might comprise a numerical value representing how a subrogation potential score should be adjusted.

Referring again to FIG. 9, it is determined whether the applicable negligence rule is favorable to eventual recovery by an insurance company. If so, a subrogation potential score might be increased at S940 (e.g., because in that particular state there is a better chance of recovering funds from another insurance company). It is then determined whether or not there are more insurance claims to process at S950. If there are no additional claims at S950, a summary report is generated and output at S960. If there are additional claims at S950, the process continues for the next insurance claim at S920 (e.g., the negligence rule associated with the next claim may be determined).

Figure 11:
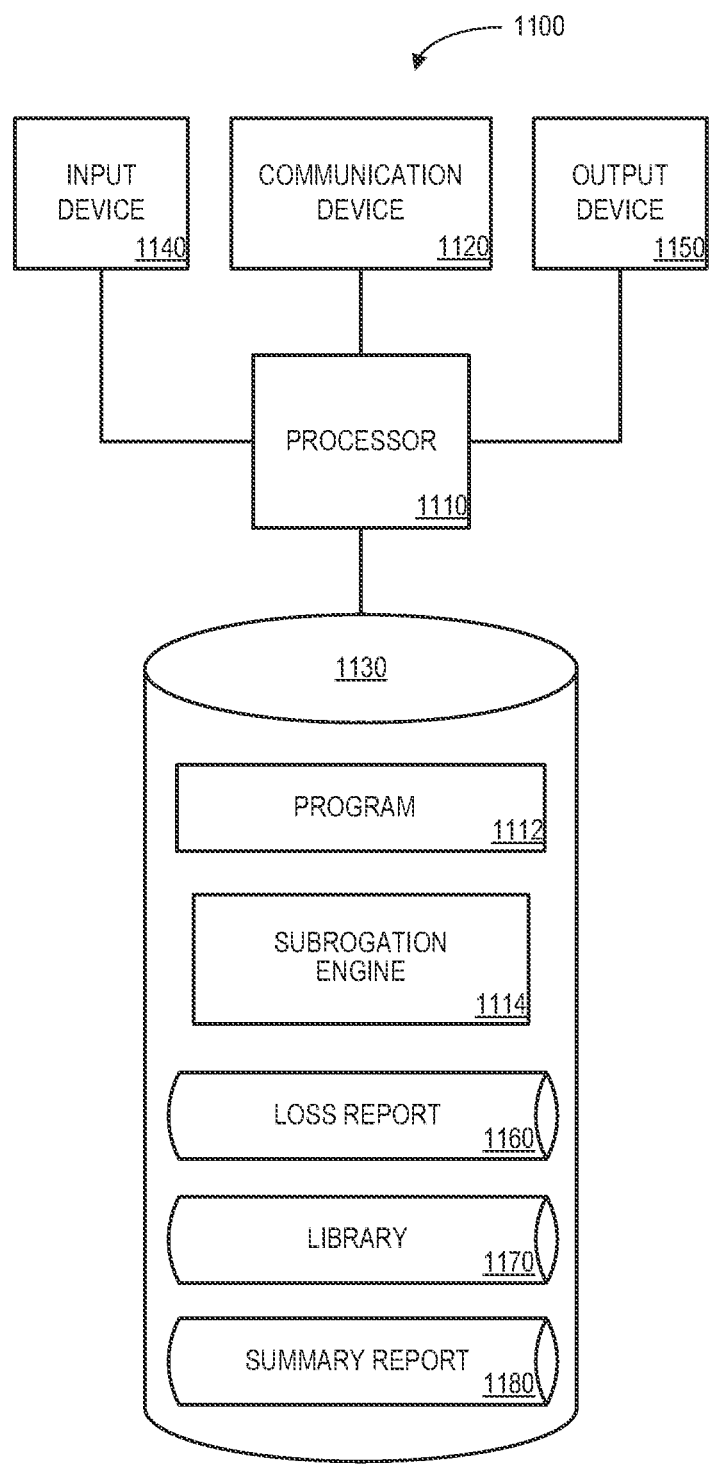
FIG. 11 is block diagram of a subrogation engine according to some embodiments of the present invention.
Figure 12:
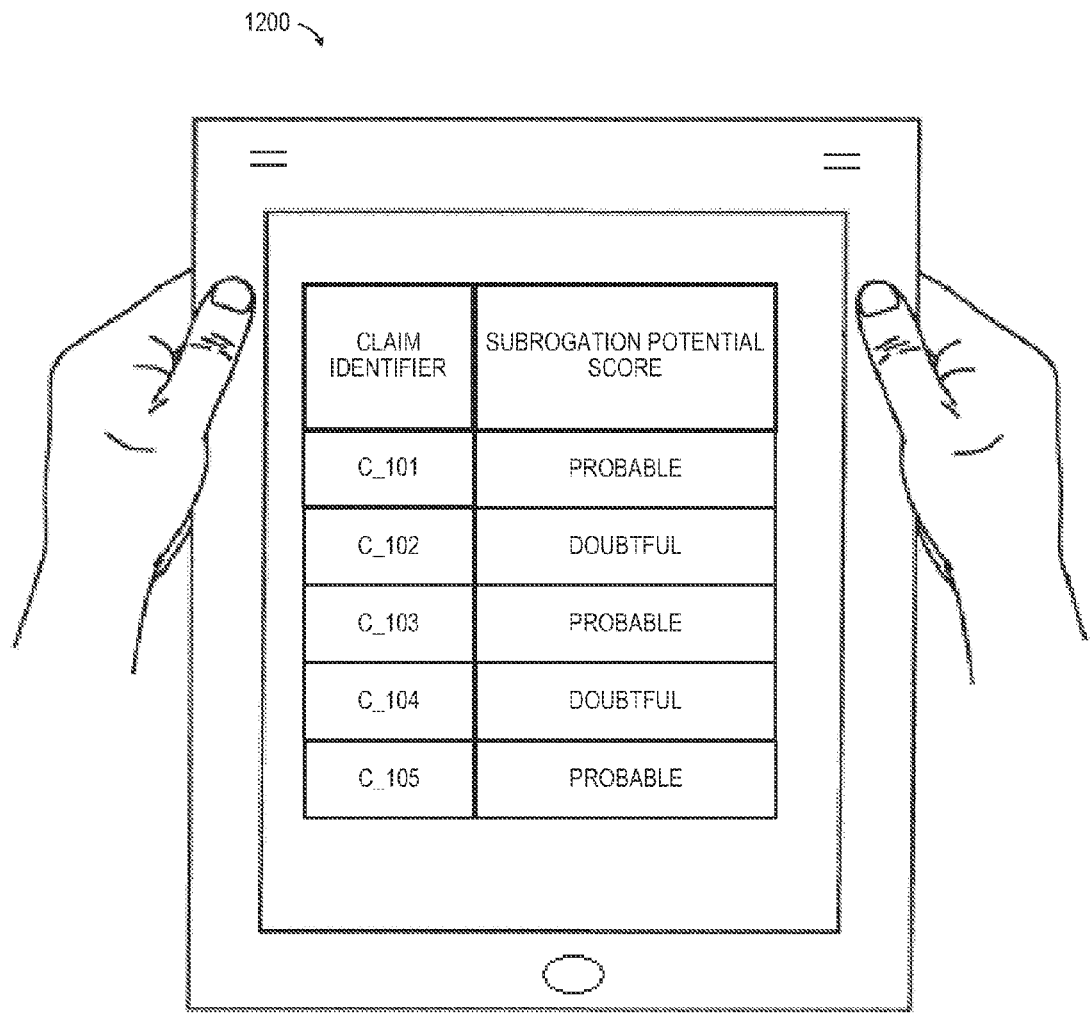
FIG. 12 illustrates a display in accordance with some embodiments described herein.

The processes described herein may be implemented using any number of different hardware configurations. For example, FIG. 11 illustrates a subrogation engine 1100 that may be, for example, associated with the systems 100 of FIG. 1. The subrogation engine 1100 comprises a processor 1110, such as one or more commercially available Central Processing Units (CPUs) in the form of one-chip microprocessors, coupled to a communication device 1120 configured to communicate via a communication network (not shown in FIG. 11). The communication device 1120 may be used to communicate, for example, with one or more remote consumer devices or third-party data services. The subrogation engine 1100 further includes an input device 1140 (e.g., a mouse and/or keyboard to enter keywords and values) and an output device 1150 (e.g., a computer monitor to display aggregated reports and results to an administrator).

The processor 1110 also communicates with a storage device 1130. The storage device 1130 may comprise any appropriate information storage device, including combinations of magnetic storage devices (e.g., a hard disk drive), optical storage devices, mobile telephones, vehicle computers, and/or semiconductor memory devices. The storage device 1130 stores a program 1112 and/or subrogation engine 1114 (e.g., a macro for a spreadsheet) for controlling the processor 1110. The processor 1110 performs instructions of the programs 1112, 1114, and thereby operates in accordance with any of the embodiments described herein. For example, the processor 1110 may load a loss report into cells of a spreadsheet application. The loss report may be associated with a plurality of insurance claims, may include, for each insurance claim: (i) a claim identifier, (ii) a claim date, (iii) a claim loss amount, and/or (iv) a claim description. The processor 1110 may then automatically calculate a subrogation potential score for each insurance claim in the loss report based on the claim date, claim loss amount, claim description, and a library containing keywords and associated keyword values. The processor 1110 may then output an indication of the claim identifier and associated subrogation potential score for each insurance claim in the loss report.

The programs 1112, 1114 may be stored in a compressed, uncompiled and/or encrypted format. The programs 1112, 1114 may furthermore include other program elements, such as an operating system, a database management system, and/or device drivers used by the processor 1110 to interface with peripheral devices.

As used herein, information may be "received" by or "transmitted" to, for example: (i) the subrogation engine 1100 from another device; or (ii) a software application or module within the subrogation engine 1100 from another software application, module, or any other source.

In some embodiments (such as shown in FIG. 11), the storage device 1130 stores a loss report 1160, a library 1170, and a summary report 1180. The examples of database described herein are only examples, and additional and/or different information may be stored therein. Moreover, various databases might be split or combined in accordance with any of the embodiments described herein.

The subrogation engine 1100 may facilitate collection of funds from other parties. For example, the subrogation engine 1100 may review a loss report and generate a list of insurance claims having a relatively high subrogation potential. Using the list, an administrator may fill out and enter a jurisdiction-specific action plan into the claims system. The administrator and/or a recovery platform may also issue a notice and/or demand letter with damage attachments that identify a responsible party. The administrator and/or recovery platform may place an entry on a calendar or diary 30 days in the future. If the claim "self-resolves" (e.g., funds are received from another party), the payment may be processed and the file may be closed. If no response is received or the claim is denied, the matter may be referred to a subrogation handler/adjuster for follow up actions (e.g. to pursue or close the matter as appropriate).

Thus, embodiments may facilitate the screening of insurance claims to identify subrogation potential in an efficient, automatic, and accurate manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with supporting automobile insurance claims. Note, however, that other types of insurance claims may also benefit from the invention. For example, embodiments of the present invention may be used in connection with medical insurance, intellectual property insurance, business insurance, and other types of insurance claims. Further, some embodiments described herein have been implemented using a spreadsheet application. Note, however, any embodiment might instead be implemented using Structured Query Language ("SQL") scripts, a data warehouse and/or an Enterprise Resource Planning ("ERP") database.

Figure 13:
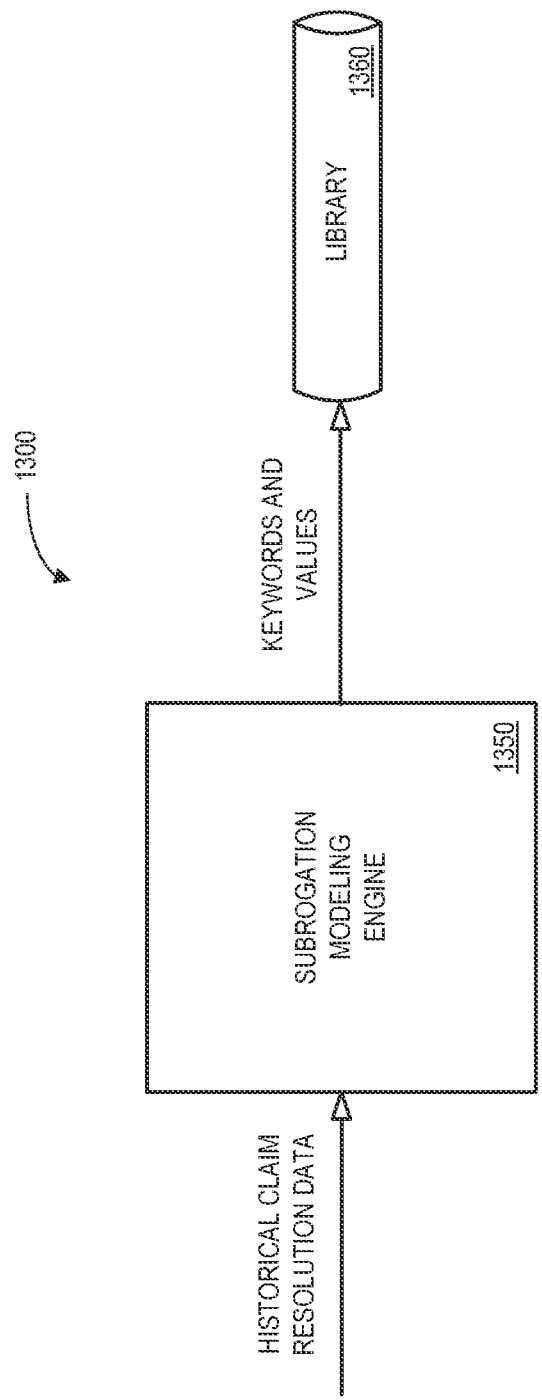
FIG. 13 is block diagram of a system according to some embodiments of the present invention.

Moreover, some embodiments have been described herein as being accessed via a PC or laptop computer. Note, however, that embodiments may be implemented using any device capable of executing the disclosed functions and steps. For example, FIG. 13 illustrates a display 1300 in accordance with some embodiments described herein. In particular, the display includes a graphical user interface including subrogation potential scores according to some embodiments.

Further, some embodiments have been described herein as having an employee of an insurance company enter keywords and/or assign appropriate values to keywords. According to some embodiments, however, some or all of such information might be automatically generated. For example, FIG. 13 is block diagram of a system 1300 according to some embodiments of the present invention wherein a subrogation modeling engine 1350 receives historical claim resolution data (e.g., from a database). The subrogation modeling engine 1350 may then automatically look for keywords and/or assign appropriate values to keywords to be stored in a library 1360. The subrogation modeling engine 1350 may use predictive models, such as neural networks, Bayesian networks, and support vector machines, in performing these tasks.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system for screening insurance claims to identify subrogation potential, the system comprising:
a computer memory storing a loss report associated with a plurality of insurance claims, wherein the loss report includes, for each insurance claim: (i) a claim identifier, (ii) a claim date, (iii) a claim loss amount, (iv) a claim description, and (v) a claim jurisdiction; and
a processor in communication with the memory, wherein the processor is configured to perform the steps of:
loading data from the loss report into a subrogation engine;
determining, by the subrogation engine for each insurance claim in the loss report, a negligence rule based on the claim jurisdiction, wherein the negligence rule comprises one of comparative negligence and contributory negligence;
automatically calculating, by the subrogation engine, a subrogation potential score comprising a numerical value for each insurance claim in the loss report, by:
assigning a subrogation potential score based on at least one keyword in a claim description associated with the insurance claim;
adjusting the subrogation potential score based on an amount paid, wherein the subrogation potential score is adjusted upward for a higher amount paid and adjusted downward for a lower amount paid; and
adjusting the subrogation potential score based on the negligence rule, wherein the subrogation potential score is adjusted upward in a comparative negligence rule jurisdiction and adjusted downward in a contributory negligence rule jurisdiction;
determining, for each insurance claim in the loss report, whether a policy-imposed deadline associated with the insurance claim has expired and responsive to an affirmative determination that the policy-imposed deadline has expired, setting the subrogation potential score to zero; and
outputting, via the subrogation engine, an indication of the claim identifier and associated subrogation potential score for each insurance claim in the loss report.

2. The system of claim 1, wherein the subrogation engine comprises a spreadsheet application and said loading comprises loading the data from the loss report into cells of the spreadsheet application.

3. The system of claim 1, wherein the processor is further configured for:
determining, for each insurance claim in the loss report, a statute of limitation time period based on the claim jurisdiction,
wherein said calculation of the subrogation potential score further comprises determining whether the statute of limitations time period has expired and setting the subrogation potential score to zero if the statute of limitations time period has expired.

4. The system of claim 1, wherein the loss report further includes, for each insurance claim, a claim type and further comprising adjusting the subrogation potential score based on the claim type.

5. The system of claim 4, wherein the claim type is associated with at least one of: (i) medical loss, (ii) property damage, (iii) rental reimbursement, and (iv) personal injury protection insurance.

6. The system of claim 1, further comprising a data storage device including a library containing keywords and associated keyword values, wherein the claim description includes a plurality of keywords in the library and said automatic calculation is based on a plurality of keyword values.

7. The system of claim 3, wherein the loss report further includes, for each insurance claim, an amount previously recovered through subrogation of an amount paid on the claim and wherein the subrogation potential score is adjusted upward for a lower amount previously recovered of the amount paid and adjusted downward for a higher amount previously recovered of the amount paid.

8. The system of claim 1, further comprising a data storage device including a library containing keywords and associated keyword values, wherein each keyword value represents a likelihood of determining fault for accidents associated with each keyword.

9. The system of claim 1, wherein the subrogation potential score comprises at least one of a numerical value, an expected dollar amount, and a classification.

10. The system of claim 1, wherein the processor is further configured for:
generating a summary report associated with a plurality of the insurance claims in the loss report.

11. The system of claim 1, further comprising:
a recovery platform coupled to the processor, wherein the recovery platform is configured to receive the claim identifiers and associated subrogation potential scores and is further to automatically initiate a recovery process.

12. The system of claim 11, wherein the recovery platform is configured to automatically create a demand letter.

13. The system of claim 1, wherein the loss report is associated with at least one of: (i) property insurance, (ii) automobile insurance, and (iii) workers' compensation insurance.

14. A computer-implemented method for screening insurance claims to identify subrogation potential, the method comprising:
loading data from a loss report into a subrogation engine, the loss report being associated with a plurality of insurance claims and including, for each insurance claim: (i) a claim identifier, (ii) a claim description, (iii) a claim date, and (iv) a claim jurisdiction;
determining, by the subrogation engine for each insurance claim in the loss report, a negligence rule comprising one of a comparative negligence rule and a contributory negligence rule, based on the claim jurisdiction;
calculating, by the subrogation engine, a subrogation potential score for each insurance claim in the loss report based on the claim description, the negligence rule, and a library containing keywords and associated keyword values by:
assigning a subrogation potential score based on at least one keyword in a claim description associated with the insurance claim;
adjusting the subrogation potential score based on an amount paid, wherein the subrogation potential score is adjusted upward for a higher amount paid and adjusted downward for a lower amount paid; and
adjusting the subrogation potential score based on the negligence rule, wherein the subrogation potential score is adjusted upward in a comparative negligence rule jurisdiction and adjusted downward in a contributory negligence rule jurisdiction;
determining, for each insurance claim in the loss report, whether a policy-imposed deadline associated with the insurance claim has expired and responsive to an affirmative determination that the policy-imposed deadline has expired, setting the subrogation potential score to zero; and
outputting, via the subrogation engine, an indication of the claim identifier and associated subrogation potential score for each insurance claim in the loss report.

15. The method of claim 14, further comprising:
determining, for each insurance claim in the loss report, a statute of limitation time period based on the claim jurisdiction,
wherein said calculation of the subrogation potential score further comprises determining whether the statute of limitations time period has expired and setting the subrogation potential score to zero if the statute of limitations time period has expired.

16. A non-transitory computer readable medium having stored therein instructions for, upon execution, causing a computer to implement method for screening insurance claims to identify subrogation potential, the method comprising:
loading data from a loss report into cells of a spreadsheet application, the loss report being associated with a plurality of insurance claims and including, for each insurance claim: (i) a claim identifier, (ii) a claim date, (iii) a claim loss amount, (iv) a claim description, and (v) a claim jurisdiction;
determining, by the subrogation engine for each insurance claim in the loss report, a negligence rule based on the claim jurisdiction, wherein the negligence rule comprises one of comparative negligence and contributory negligence;
calculating, by a subrogation engine, a subrogation potential score for each insurance claim in the loss report based on the claim date, claim loss amount, claim description, the negligence rule, and a library containing keywords and associated keyword values by:
assigning a subrogation potential score based on at least one keyword in a claim description associated with the insurance claim;
adjusting the subrogation potential score based on an amount paid, wherein the subrogation potential score is adjusted upward for a higher amount paid and adjusted downward for a lower amount paid; and
adjusting the subrogation potential score based on the negligence rule, wherein the subrogation potential score is adjusted upward in a comparative negligence rule jurisdiction and adjusted downward in a contributory negligence rule jurisdiction;
determining, for each insurance claim in the loss report, whether a policy-imposed deadline associated with the insurance claim has expired and responsive to an affirmative determination that the policy-imposed deadline has expired, setting the subrogation potential score to zero; and
outputting, via the spreadsheet application, an indication of the claim identifier and associated subrogation potential score for each insurance claim in the loss report.

17. The medium of claim 16, wherein the method further comprises:
determining, for each insurance claim in the loss report, a statute of limitation time period based on the claim jurisdiction,
wherein said calculation of the subrogation potential score further comprises determining whether the statute of limitations time period has expired and setting the subrogation potential score to zero if the statute of limitations time period has expired.

* * * * *